United States Patent
Hart et al.

(10) Patent No.: US 7,340,000 B1
(45) Date of Patent: Mar. 4, 2008

(54) DECISION FEEDBACK EQUALIZER IN AN OFDM WLAN RECEIVER

(75) Inventors: Brian Hart, Wollstonecraft (AU); John D. O'Sullivan, Hunters Hill (AU)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 10/918,761

(22) Filed: Aug. 13, 2004

(51) Int. Cl.
*H04L 27/28* (2006.01)

(52) U.S. Cl. .................................... 375/260

(58) Field of Classification Search ................ 375/229, 375/230, 231, 232, 233, 234, 235, 236, 260, 375/316, 349; 333/18, 282; 708/300, 322, 708/323; 379/340, 398
See application file for complete search history.

(56) References Cited

U.S. PATENT DOCUMENTS

2004/0091057 A1* 5/2004 Yoshida ..................... 375/260

OTHER PUBLICATIONS

Kim et al. Residual ISI Cancellation for OFDM with Applications to HDTV Broadcasting, IEEE, 1998, p. 1590-1599.*

* cited by examiner

*Primary Examiner*—Sam K. Ahn
(74) *Attorney, Agent, or Firm*—Dov Rosenfeld; Inventek (57) ABSTRACT

In an OFDM radio receiver for a wireless packet network, an apparatus to equalize a presently received OFDM signal containing subcarriers using an equalizing signal formed from the past symbols of subcarriers. The apparatus includes a subtractor to subtract the equalizing signal from the present signal, a DFT device to convert to subcarriers, a forward processor to correct the subcarriers for the channel and phase errors, a decision device to make decisions for the subcarriers, a reverse processor to corrupt the decision-based subcarriers' phase in the same manner as the forward processor corrects the subcarrier's phase, an inverse DFT device to form a time signal from the reverse processed subcarriers, and a feedback filter to generate the equalizing signal. The feedback filter's impulse response is directly calculated from an estimate of the channel response.

30 Claims, 6 Drawing Sheets

DECISION FEEDBACK EQUALIZER IN AN OFDM WLAN RECEIVER

BACKGROUND

The present invention is related to wireless networks, and in particular, to using decision feedback equalizers in a receiver of OFDM signals.

Wireless networks are becoming more widespread. The IEEE 802.11 wireless local area standard, for example, describes a popular wireless local area network standard. Different variants of the standard use different modulation methods. The IEEE 802.11a variant and the OFDM part of the 802.11g variants use a multicarrier method such as Orthogonal Frequency Division Multiplexing (OFDM) which has the feature of being effective in the presence of multipath and the delay spread it causes.

In a typical OFDM modulation method, delay spread is dealt with by a cyclic extension that "hides" the smeared-out energy (the delay spread). However, when the delay spread is long, e.g., energy in the multipath "echoes" of the one OFDM symbol (called delays) has not tapered to near-zero after the cyclic extension length at the next OFDM symbol, then the long delays then affect the next OFDM symbol and degrade the signal quality, e.g., as measured by the error vector magnitude (EVM) of the next OFDM symbol, and thus the packet error rate (PER) of the communication. We call this effect inter-OFDM-symbol interference. This effect occurs at a lower delay spread as the data rate increases. For example, in a typical IEEE 802.11a system, the inventors have found that communication at 6 Mbit/s breaks down with delay spreads of more than about 400 ns, while 54 Mbit/s communication breaks down for delay spreads greater than about 125 ns RMS.

There thus is a need to improve the inter-OFDM-symbol interference performance of OFDM receivers in the presence of long delay spreads.

In particular, there is a need in the art for a method and an apparatus that remove inter-OFDM-symbol interference caused by long delay spread to provide high data rates, e.g., almost independently of the length of the delay spread.

In single carrier communication links, methods and apparatuses are known to deal with delay spread and the effects it has on the channel impulse response, carrier-to-interference ratio (CIR), dispersion, frequency selectivity, and intersymbol interference (ISI), include using a linear equalizer (equalizer) and using a decision feedback equalizer (DFE).

In OFDM receivers, the problem to be solved is not quite the standard equalization problem. In OFDM, delays up to the cyclic extension length provide a desirable or benign contribution, since the much of the energy of the spread is captured by the discrete Fourier transform (DFT) operation typically implemented in an OFDM receiver by a fast Fourier transform (FFT) and most of the remaining energy occurs up to the cyclic extension and so is not input to the DFT operation and hence does not cause inter-OFDM-symbol interference. Delay spread beyond the cyclic extension decreases performance.

Thus there is a need in the art for an equalizer that removes distant delays that lead to inter-OFDM-symbol interference, but not short delays.

A linear equalizer comprising a feedforward filter whose filter coefficients are the inverse of the channel impulse response is known. For the OFDM variants of the IEEE 802.11 standard, an OFDM packet includes only two long symbols and these directly abut data symbols. Thus, if a linear equalizer is to be used, there is typically not sufficient time to adapt to the proper feedforward filter coefficients. Thus, these coefficients would need to be computed directly, and very fast. Using a linear equalizer and estimating its coefficients by inverting the channel impulse response is computationally messy. Therefore, a decision feedback equalizer that has a trivial feed-forward filter is more desirable.

Thus there is a need in the art for a decision feedback equalizer that removes distant delays that lead to inter-OFDM-symbol interference, but that does not necessarily remove short delays.

SUMMARY

Described herein is a method and an apparatus operable in an OFDM radio receiver for a wireless packet network, an apparatus to equalize a presently received OFDM signal containing subcarriers using an equalizing signal formed from the past symbols of subcarriers. The apparatus includes a subtractor to subtract the equalizing signal from the present signal, a DFT device to convert the difference to subcarriers, a forward processor to correct the subcarriers for the channel and phase errors, a decision device to make decisions for the subcarriers, a reverse processor to corrupt the decision-based subcarriers' phase in the same manner as the forward processor corrects the subcarriers' phases, an inverse DFT device to form a time signal from the reverse processed subcarriers, and a feedback filter to generate the equalizing signal. The feedback filter's impulse response is directly calculated from an estimate of the channel response.

BRIEF DESCRIPTION OF THE DRAWINGS

FIGS. 3A, 3B, and 3C illustrate the principle of an inventive DFE.

DETAILED DESCRIPTION

One aspect of the invention is a decision feedback equalizer (DFE) for ODFM. In OFDM, delays up to the cyclic extension length provide a desirable or benign contribution, since the energy of the spread is captured by the discrete Fourier transform (DFT) operation typically implemented in an OFDM receiver by a fast Fourier transform (FFT) or ignored by being between the samples input to the DFT. Larger delays cause harm. Therefore, one aspect of the invention is a DFE designed to remove only relatively distant delay spreads that could cause inter-OFDM-symbol interference.

Figure 1:
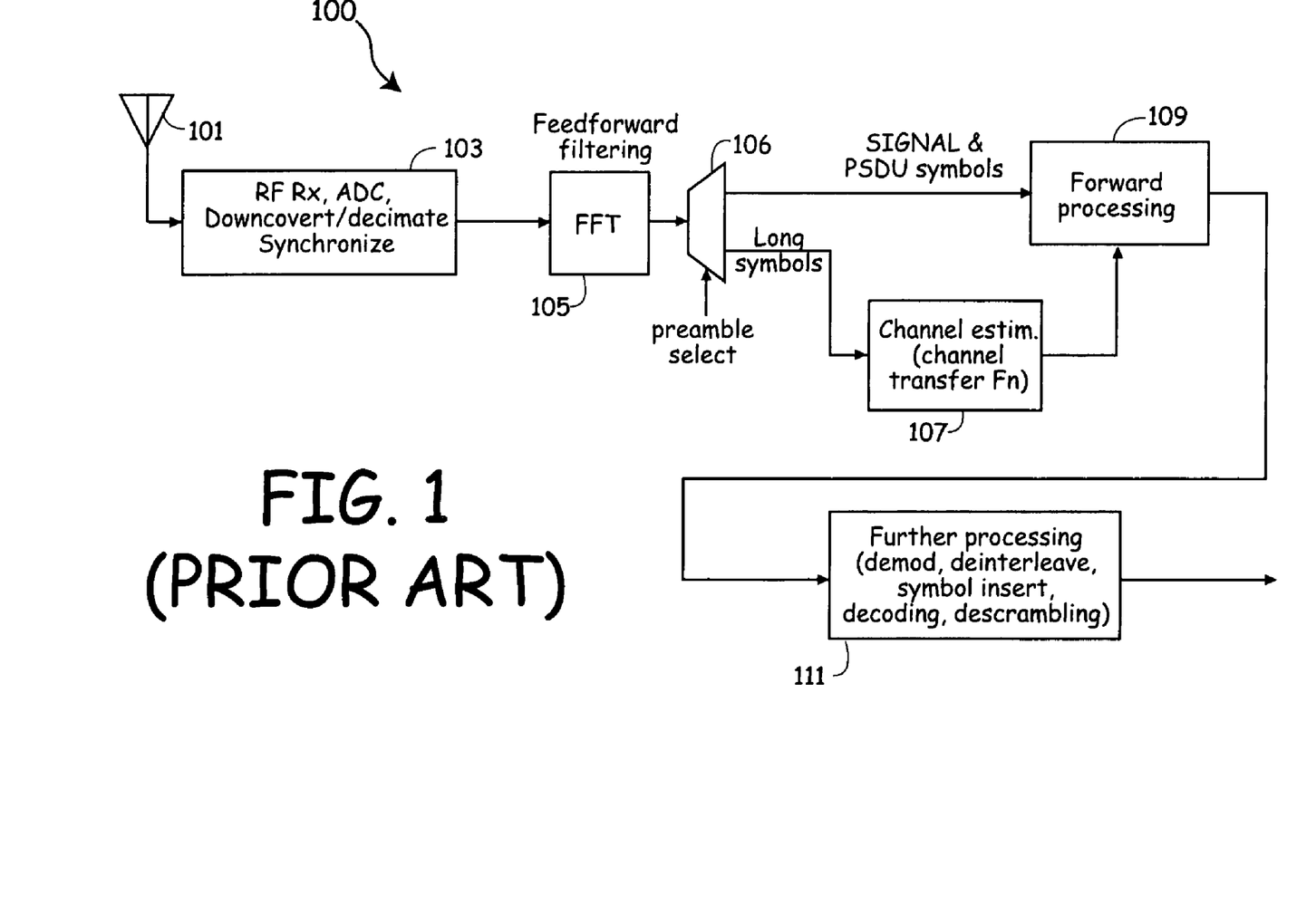
FIG. 1 shows in simplified block diagram form, one embodiment of a typical prior art OFDM receiver.
Figure 4:
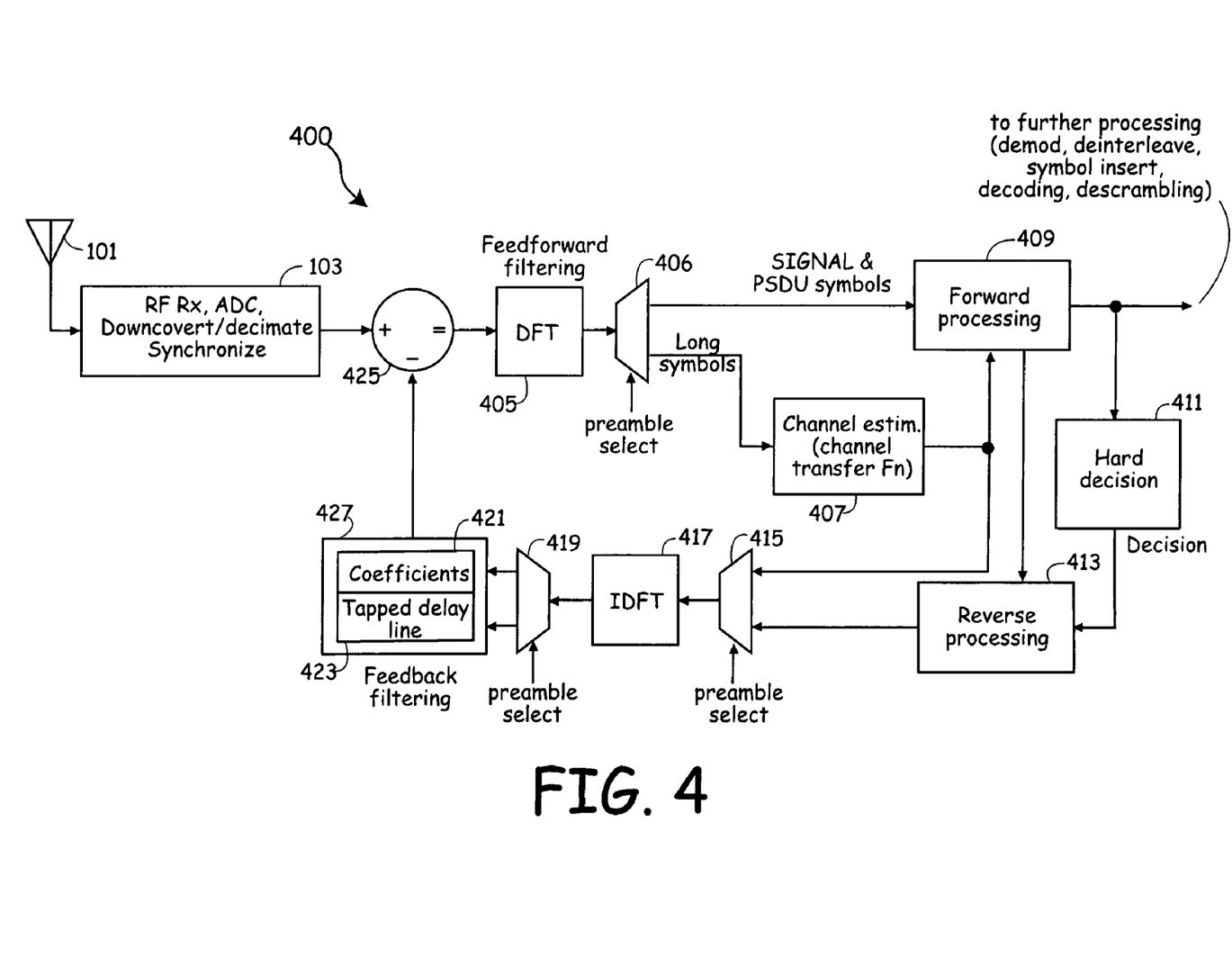
FIG. 4 shows in simplified block diagram form, an embodiment of a receiver in which several of the elements of a receiver such as that of FIG. 1 are included with a decision feedback equalizer according to aspects of the present invention.

FIG. 1 shows one embodiment of a typical prior art OFDM receiver 100, and FIG. 4 shows one embodiment of a typical OFDM receiver 400 that includes a DFE that incorporates aspects of the invention. The receivers 100 and 400 are designed for receiving signals that conform to one or more variants of the IEEE 802.11 standard, e.g., IEEE 802.11a and IEEE802.11g. For the purposes of explanation, the receivers 100 and 400 will be assumed to be for receiving signals that conform to the IEEE 802.11a specification. The invention, however, is not restricted to such signals, and may be applied to any of the OFDM variants of IEEE 802.11 standard or other OFDM specifications that include OFDM signals that have a guard interval, also called a cyclic extension.

Referring first to FIG. 1, receiver 100 has at least one antenna 101 to receive signals that conform to IEEE 801.11a. A receiver subsection 103 is included and has a RF receiver that provides analog signals, and at least one analog to digital converter (ADC) to provide digital samples. Such a receiver subsection 103 may conform, for example, to part of the receiver described in U.S. patent application Ser. No. 10/807,547 to inventors Hart et al., filed Mar. 22, 2004, titled CHANNEL TRACKING IN AN OFDM WIRELESS RECEIVER, assigned to the assignee of the present invention. U.S. patent application Ser. No. 10/807,547 is incorporated herein by reference. In this particular receiver, the analog part of receiver subsection 103 provides a single analog signal that is centered around a relatively low intermediate frequency, such that further downconversion and decimation is used after sampling by a single ADC to produce I and Q baseband signals. The baseband signals are synchronized for frequency drift such that the output of the receiver subsection 103 is a set of complex valued (I and Q) basesband signals. Those in the art will understand that alternate receivers may be used.

The received baseband signals are converted to the subcarriers (also called tones) using a Fourier transformer that in the embodiment of FIG. 1 carries out an FFT operation (block 105) to produce the set of subcarriers for further processing, including channel correction, demodulation, and decoding.

Figure 2:
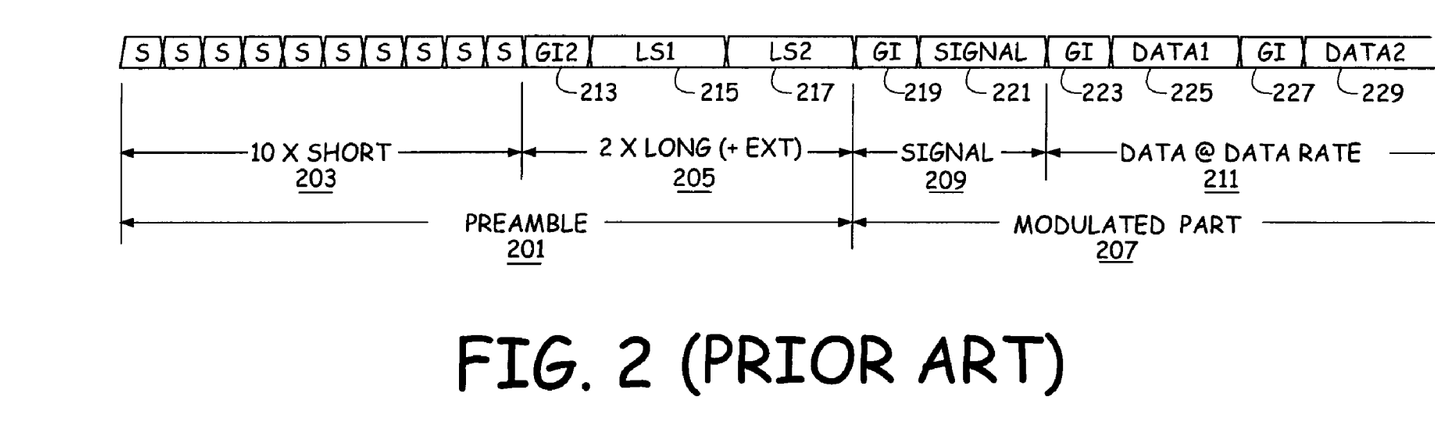
FIG. 2 shows a typical packet that conforms to the IEEE 802.11a standard.

A typical OFDM packet as used in the IEEE 802.11 standard includes a preamble that provides for various operations, such as automatic gain control, synchronization, and estimation of the channel response for channel correction. FIG. 2 shows a typical packet that conforms to the IEEE 802.11a standard. The packet includes a 16 µs-long preamble 201 and a modulated part 207. Each OFDM symbol occurs over a 4 µs long interval, which includes an 800 ns cyclic extension (also called guard interval). The preamble 201 includes an 8 µs-long first preamble part 203 that has ten "short" symbols used for start of packet detection, AGC, and other functions, followed by a long symbol part 205, also 8 µs-long, that includes two identical so-called "long symbols" that are each identical regular length (3.2 µs) and known OFDM symbols 215 and 217, respectively, with a double-length 1600 ns long guard interval 213 beforehand. The long symbols are used, e.g., as described in U.S. patent application Ser. No. 10/217,117 titled CHANNEL ESTIMATION IN A MULTICARRIER RADIO RECEIVER, filed Aug. 12, 2002, and in above-mentioned U.S. patent application Ser. No. 10/807,547, for channel estimation and may also be used for other functions such as fine frequency sychronization. Immediately following the preamble 201 is the modulated part 207 of the packet that starts with a field encoded at a relatively low data rate and which provides information about how the remainder of the packet is encoded and modulated. This field 221 is called the SIGNAL field herein, and it has a cyclic extension (guard interval) 219. The SIGNAL field is followed by the symbols 225, 229, and so forth that are at the data rate specified in the SIGNAL field 221 and that have respective guard intervals 223, 227, and so forth.

Referring again to FIG. 1, the typical OFDM receiver embodiment 100 includes a channel estimator 107 that uses one or both of the long symbols 215 and 217 to calculate an approximation of the channel response for each channel. The receiver 100 further includes processing 109 for the modulated part that includes correcting each subcarrier for the channel, phase correction using pilot subcarriers included in the OFDM signal, channel state indication determination for use in determining which subcarriers are reliable or not, and so forth. Such forward processing 109 is known in the art in many variations. To select when signals are routed to the channel estimator 107 and when to the forward processing 109, a mechanism using a selector 106 under control of a "preamble select" signal is shown, and other alternate mechanisms for so routing the signals are also known. The signals after forward processing 109 are then further processed, e.g., demodulated, de-interleaved, subject to symbol insertion, then decoded and descrambled. Those further processing aspects are not the subject of the present invention.

The present invention introduces DFE applied to OFDM signals, e.g., 802.11a OFDM signals.

Figure 3A:
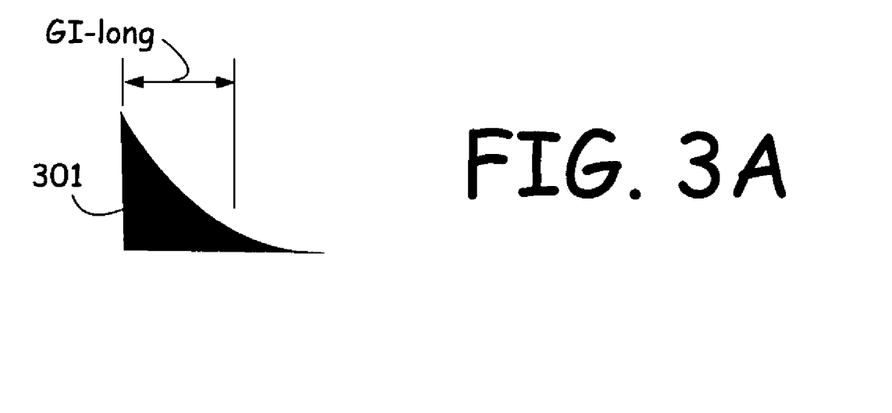
FIG. 3A shows a typical but fictional channel impulse response.
Figure 3B:
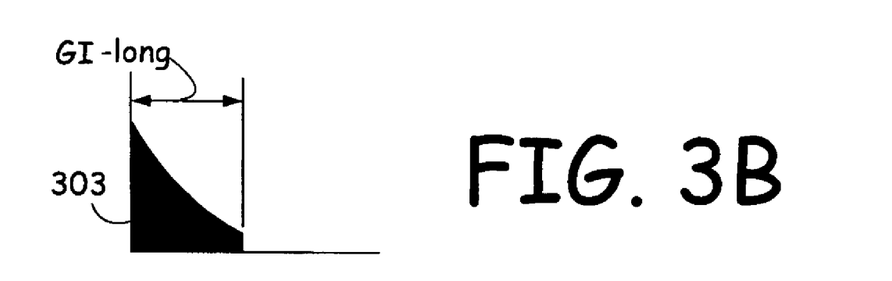
FIG. 3B shows the part of the channel impulse response that is typically taken care of by the cyclic extension.
Figure 3C:
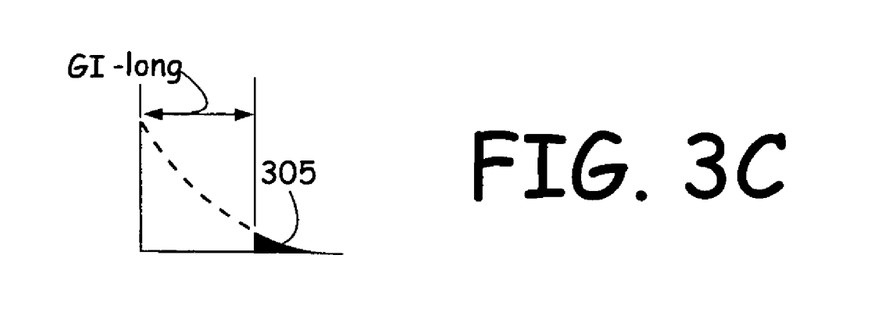
FIG. 3C shows the part of the channel impulse response that is required to be accounted for using the DFE.

FIGS. 3A, 3B, and 3C illustrate the principle of the desired DFE. FIG. 3A shows a typical but fictional channel impulse response 301, shown here for the purpose of illustration as a channel impulse response that is longer than the guard interval (the cyclic extension) used in the OFDM packet. For IEEE 802a packets, the cyclic extension is 800 ns. FIG. 3B shows the part 303 of the channel impulse response 301 that is taken care of by the cyclic extension. FIG. 3C shows the part 305 of the channel impulse response 301 that is required to be accounted for using the equalizer, in particular, using the inventive DFE described herein. The part of the channel impulse response that is post the cyclic extension length, e.g., as shown in FIG. 3C, is called the "ISI-part of the impulse response" herein.

A traditional DFE comprises a feedforward filter, a feedback filter, and a decision device. In that case the feedforward and feedback filters are filters defined by impulse responses (filter coefficients), then in general, the feedforward filter coefficients are related to the inverse of the channel impulse response, and the feedback filter coefficients are related to the feedforward filter coefficients convolved with the channel impulse response. In the inventive OFDM receiver shown in FIG. 4, the OFDM-DFE uses knowledge of the channel impulse response as determined by the channel estimator and symbol decisions on a previous OFDM symbol, e.g., the last OFDM symbol, to remove intersymbol interference from a future, e.g., the next, OFDM symbol. In the case that the feedforward filter is a single delay, i.e., the impulse response is a single delta function, then the feedback filter coefficients are the part of the channel impulse response not handled by the cyclic extension. This is determinable from the channel impulse response, which in turn is determinable from the channel frequency response from the frequency subcarriers.

FIG. 4 shows an embodiment of a receiver 400 in which several of the elements of a receiver such as that of FIG. 1 are included with a DFE and wherein the previous symbol decision is used to equalize the next, i.e., the present, symbol. Of course those in the art will understand that each element of FIG. 4 that performs the same function of a corresponding element of FIG. 1 need not be identical to the prior art element of FIG. 1, but may be so. Thus, for example, in FIG. 4, the DFT unit (an FFT in FIG. 1), the selector, the channel estimator and the forward processing units of receiver 400 are given new reference numerals 405, 406, 407, and 409, respectively, while the front end 103 has the same reference numerals in FIGS. 1 and 4. In receiver 400, the DFE feedforward filter is a one-tap feedforward filter, and provided by the DFT device 405. For this, the DFT (or FFT) operation is required to be low-latency. The forward processing 409 includes channel correction and any pilot correction and in one embodiment is also low-latency. In order to be low-latency, the symbol decision used for the decision feedback needs to be quickly obtained, so in one embodiment, a hard decision device 411 is provided for the hard decisions. Because it is required to replicate the received signal as if there was no multipath, any phase and timing errors that are detected by any phase correction applied in the forward processing are reapplied in a reverse processing unit 413. Therefore, FIG. 4 shows a connection between the forward processing unit 409 and the reverse processing unit 413 that indicates any information that is passed from, e.g., any pilot correction unit in 409. Thus, the signal subject to the feedback filtering tracks carrier/timing of the signals from the receiver subsection 103.

A finite impulse response feedback filter 427 implemented as a tapped delay line 423 using a set of coefficients 421 is provided for the DFE to process the signals based on the hard decisions. Since the decisions are made on individual subcarriers, i.e., in the frequency domain, an inverse DFT operation performed on the signals from the hard decisions, in one embodiment using an inverse FFT device 417. After feedback filtering, a subtractor 425 is used to subtract the feedback filtered post-decision inverse transformed signals from the output of the receiver subsection 103. This provides the appropriately equalized signals.

The coefficients 421 of the feedback filter 427 are obtained by an inverse DFT operation performed on the channel response determined by the channel estimator 407. This is carried out in one embodiment by an inverse DFT device 417. The resulting coefficients provide the channel impulse response. The part of the channel impulse response that is post the cyclic extension (see FIG. 3B) is determined from the channel impulse response and used as the set of filter coefficients 421 for the tapped delay line 423 of the feedback filter 427.

In one embodiment, the channel estimator 407 is as described in U.S. patent application Ser. No. 10/217,117 titled CHANNEL ESTIMATION IN A MULTICARRIER RADIO RECEIVER, filed Aug. 12, 2002. U.S. patent application Ser. No. 10/217,117 is incorporated herein by reference. In another embodiment the channel estimator of above-mentioned U.S. patent application Ser. No. 10/807, 547 is used.

The multiplexer 415 and selector 419 are used to determine the signal path according to whether the packet is at the preamble or post preamble. During the preamble, the multiplexer 415 and selector 419 are set to pass the channel response from the channel estimator 407 via the inverse FFT 417 to determine the filter coefficients. Once the filter coefficients are available, the remainder of the packet is processed when the multiplexer 415 and selector 419 set to pass the decisions via the reverse processing 413 such that the feedback filter processes the previous decision.

The channel estimator determines the channel response, which when inverse transformed, determines the channel impulse response over the time-span of each of the long symbols 215 and 217 of the preamble, i.e., 3.2 µs. Thus, in theory, the DFE described herein is able to equalize up to 3.2 µs minus the 0.8 µs is taken care of by the cyclic extension of each symbol. The remainder may be taken care of by the DFE by the feedback filter filtering by the ISI part of the channel impulse response.

To check operation of the equalizer, consider the SIGNAL field and the subsequent OFDM symbols processed through the system, and suppose there is no noise or multipath present. The received SIGNAL and subsequent PSDU samples are DFT'd (unit 405), corrected for the channel (unit 409), hard decisions are made (unit 411), carrier and timing matched (unit 413), then the results inverse DFT'd (IDFT'd by IDFTunit 417), such that that the IDFT'd results match the transmitted signal albeit affected by carrier and timing effects. These are fed into filter 427 and filtered with the ISI-part of the channel impulse response to synthesize a copy of the inter-OFDM-symbol interference. This is fed to the subtractor 425 to cancel the actual inter-OFDM-symbol interference.

In many prior art DFEs, the feedback filter parameters, e.g., the filter coefficients are calculated by slow adaptation as more data is received. In the present embodiment, the long symbols are used to determine the channel response, which in turn is used to determine the channel impulse response for the feedback filter coefficients. Furthermore, the receiver needs to process the important SIGNAL field that immediately follows the two long symbols. Thus, there is not much time available to determine the feedback filter coefficients. Therefore, the inventors decided to determine the feedback filter coefficients directly by calculation rather than use an adaptive mechanism to adapt towards the coefficients. When the feedforward filter is modeled as a delta function impulse response, the feedback filter coefficients may be directly calculable from the channel response determined by the channel estimator.

Another aspect of the invention is incorporating components and/or methods that carry out the required processing in the required time. In one embodiment, the data entering the DFT unit is a serial set of complex valued (I,Q) samples at a sample rate of 20 MHz, such that it takes a complete symbol period for the time-domain data to be available in the DFT unit. The impulse response of the feedback filter 427 (FIG. 4) is zero for the guard interval period, and then takes on the value of the channel impulse response post-guard-interval. Thus, there is the guard interval time—800 ns—before the first sample is FIR filtered by a non-zero element of the filter impulse response. Therefore, the processing including the feedforward filter (the DFT/FFT 405), the forward processing 409, the hard decisions 411, the reverse processing 413, and the IDFT/IFFT 417 all need to occur within the cyclic extension time, 800 ns for the IEEE 802.11 standard, in order for the samples to be available for the feedback filtering.

The selectors are assumed to be relatively low latency, so they are not regarded as critical elements. Those in the art will understand that in an actual design, all latencies need to be accounted for.

Figure 5:
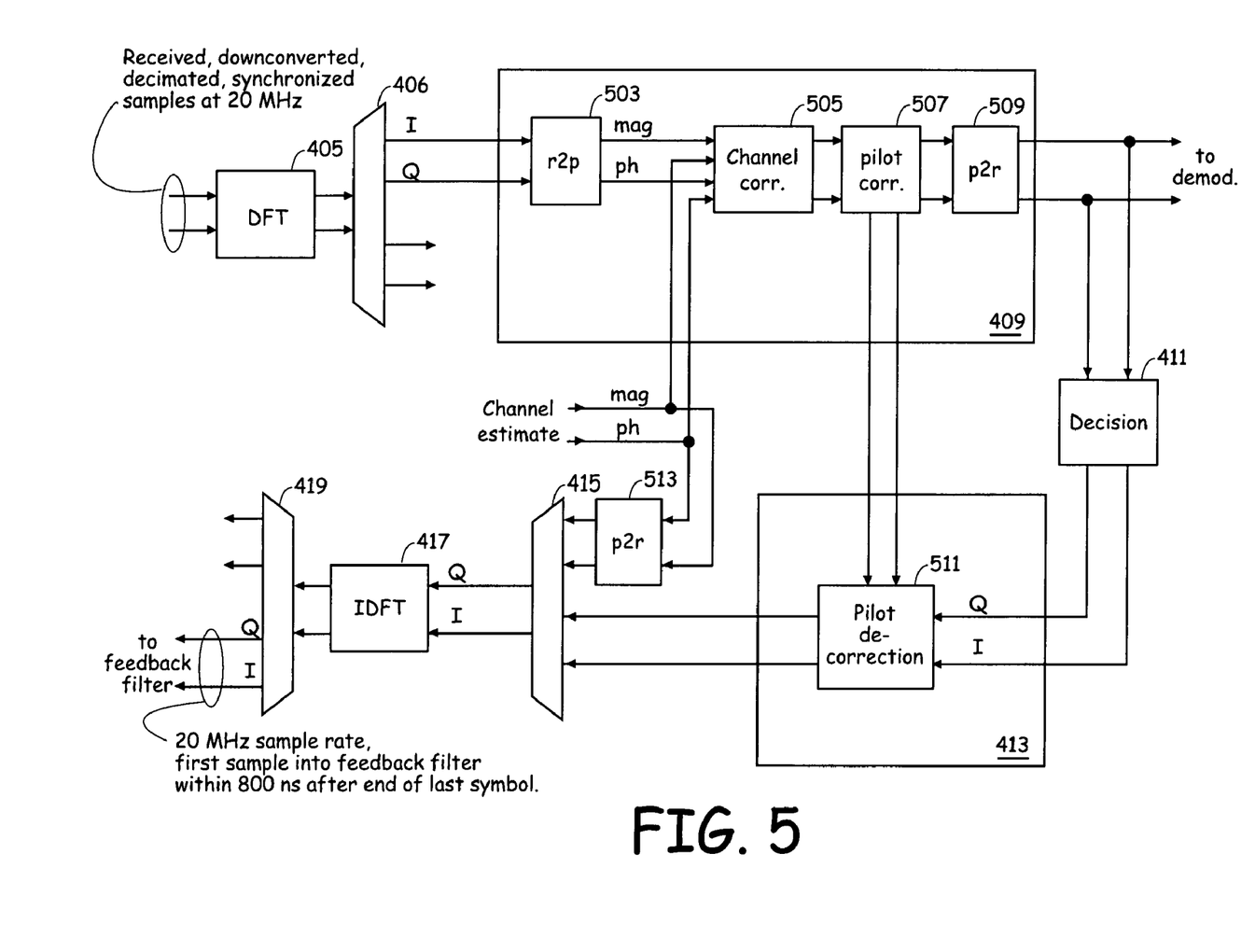
FIG. 5 shows in simplified block diagram form, an embodiment of the forward processing of unit 409 and reverse processing of unit 413 in more detail.

FIG. 5 shows an embodiment of the forward processing of unit 409 and reverse processing of unit 413 in more detail. The DFT device 405 produces samples in rectangular coordinates. The forward processing subsystem 409 includes a rectangular-to-polar coordinate converter 503, in the form of a Cordic, and a channel corrector 505 that divides the magnitude and phase response of each subcarrier by the estimated channel response to correct for the channel for the subcarrier. In one embodiment, the channel corrector 505 is in the form of a ratio multiplier. Each channel corrected subcarrier is phase corrected in a pilot correction unit 507 based on the known pilot subcarriers—subcarriers at ±7 and ±21 for the IEEE 802.11a standard. The pilot subcarriers in each OFDM symbol are transmitted with a pre-determined phase of either 0° or 180° as determined by a 127-bit pseudo-random scrambling sequence. In the receiver, a pilot tone descrambler removes any 180° phase inversion before pilot correction processing is performed. In the pilot correction block 507, in one embodiment, the output phase vector is calculated by subtracting the vector of estimated phase shifts since the start of the packet from the input phase vector of the current OFDM symbol. In one embodiment of unit 507, phase shift is estimated by performing linear regression on the pilot phase shifts since the start of the packet, followed by linear interpolation to generate phase shift estimates for the other subcarriers. Such linear regression involves calculating the regression constants (phase slope and phase intercept) for an interpolation formula.

In one embodiment in which channel state estimation is included, only pilot tones that have a sufficient channel state are used or pilots are weighted according their channel state.

The pilot correction block 507 thus provides phase and/or timing corrected, channel-corrected subcarriers. These subcarriers are converted to rectangular coordinates by a polar-to-rectangular coordinate converter 509, in one embodiment a Cordic, to complete the forward processing of subsystem 409.

Note also that because in one embodiment, the channel estimates are provided in polar coordinates, a polar-to-rectangular coordinate converter 513 is included to convert the channel response to rectangular coordinates for inverse DFT'ing the data to generate the channel impulse response to use as the impulse response of the feedback filter 419.

Returning back to the operation during the time that modulated symbols arrive, in one embodiment, the decision subsystem 411 makes a hard decision. The outputs of the decision unit are subcarriers based on decisions, but without the phase and/or timing errors. The reverse processing subsystem 413 includes an error generator 511 to introduce one or both of the phase and timing errors corrected for in the pilot correction unit 507. In the preferred embodiment, both phase and timing errors are introduced. For this, a measure of one or both of the timing and phase errors corrected for in the forward processing subsystem is provided to the reverse processing subsystem. In one embodiment, this is provided by the phase slope and phase intercept calculated for the pilot correction unit 507.

In one embodiment, the phase shift is applied in the reverse processor by a Cordic 511. Because such a Cordic has a gain, in one embodiment the decision subsystem includes scaling the decision output by the inverse of the gain of the Cordic 511.

After reverse processing, assuming modulated OFDM symbols after the preamble, the data enters the inverse DFT processor 417.

As described earlier, the impulse response of the feedback filter 421 (FIG. 4) is zero for the guard interval period, and then takes on the value of the channel impulse response post-guard-interval. Thus, there is the guard interval time—800 ns—before the first sample is FIR filtered by a non-zero element of the filter impulse response. In order to provide the data to the filter in time, one aspect of the invention is using a fast enough DFT calculator to provide such processing in time, and fast enough forward processing, reverse processing, and inverse DFT calculation.

One embodiment provides the pilot tones early in order not to have to wait for pilot information to carry out pilot correction.

In one embodiment, the pilots are calculated in a fast DFT subsystem, and the other subcarriers are calculated by one or more other slower DFT subsystems such as a serial input/output FFT.

In one version, a fully parallel DFT calculator is used for all the 64 samples to determine all the subcarriers, including the pilots, in parallel. To carry this out, the parallel DFT calculator includes multiplying by $\exp(-j2\pi mn/64)$ or $\exp(j2\pi mn/64)$ depending on the forward or inverse DFT, and accumulating for 64 samples n for m=0, 1, 2, . . . , 63. This requires 64 complex-valued multipliers and 64 complex-valued accumulators. Since not all subcarriers are used according to the IEEE 802.11 standard, fewer accumulators may be used, such as 52 accumulators.

In an alternate parallel embodiment, note that a multiplication of a quantity by $\exp(j\phi)$ gives four real-valued product terms. By carrying out the additions of such terms in different ways, $j \exp(j\phi)$, $-\exp(j\phi)$, $-j \exp(j\phi)$, $\exp(-j\phi)$, $j \exp(-j\phi)$, $-\exp(-j\phi)$, and $-j \exp(-j\phi)$ are also all available. Therefore, in an alternate embodiment, instead of 64 complex-valued multipliers, only 32 or even fewer such "product sharing" complex-valued multipliers are used. However a complex-valued accumulator is still needed for each subcarrier, e.g., 64 accumulators are needed. Furthermore, using a large multiplexer bank, the coefficients for multiplication can be fixed, so that the eight * complex-valued multipliers can be eight * multipliers by fixed (complex-valued) quantities.

Thus, in one embodiment, a parallel DFT device is used for the forward DFT, each device having with it a memory for serial input (for the forward DFT) or serial output (for the Inverse DFT), a multiplexer bank, 32 complex-valued fixed multipliers, and 64 complex valued accumulators.

In another embodiment, a pilot DFT device is used in parallel with one or more parallel DFT devices fast enough to provide all subcarriers for forward processing, decision making, reverse processing, and inverse DFT processing in sufficient time.

In an alternate embodiment, a single, very fast clock rate FFT is used for carrying out the forward discrete Fourier transform.

The pilot DFT device for determining the pilot subcarriers at ±7 and ±21, includes four complex multipliers, or in an alternate embodiment, two "product sharing" complex multipliers.

In order to carry out the forward processing, decision, and reverse processing in time, one embodiment uses duplicate forward processing subsystems, decision subsystems, and reverse processing subsystems to carry out the forward processing, decision, and reverse processing in sufficient time.

Figure 6:
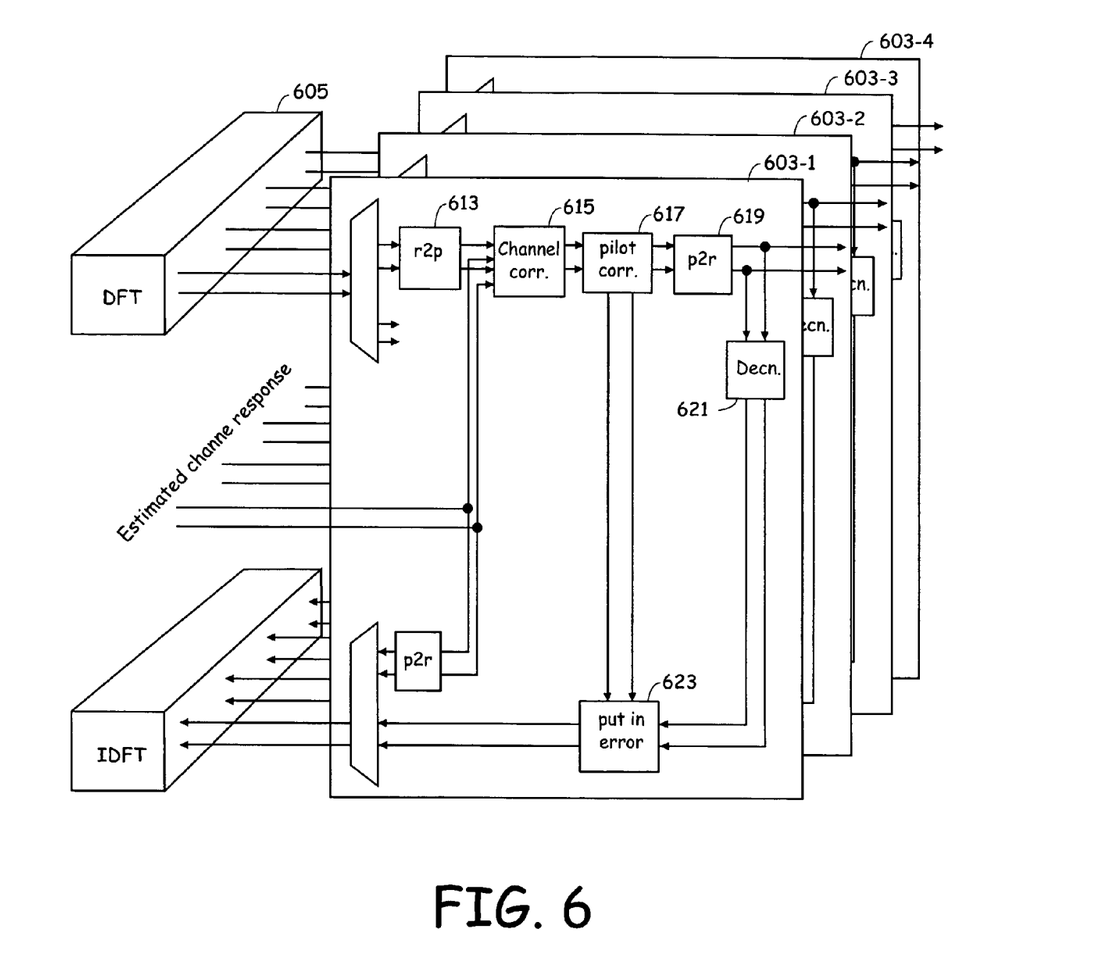
FIG. 6 shows an embodiment of the forward processing of unit 409 and reverse processing with four parallel datapaths for forward processing, decisions, and reverse processing.

FIG. 6 shows an embodiment with four parallel datapaths 603-1, 603-2, 603-3, and 603-4 for forward processing, decisions, and reverse processing. Datapath 603-1, for example, includes a rectangular-to-polar converter 613, a channel corrector 615, a pilot corrector 617, a polar-to-rectangular converter 619, a decision subsystem 621, and a reverse processing subsystem 623. A DFT 605 unit accepts the symbol time domain data and produces the four pilot subcarriers in parallel so that each of the four pilot correction blocks, in the four parallel datapaths 603-1, 603-2, 603-3, and 603-4 have the pilot correction information.

Note that for filling the feedback filter tapped delay line 423, the data is entered one sample at a time at 20 MHz. Thus, the inverse DFT unit need not have the stringent speed requirements of the forward DFT unit.

Thus has been described a DFE apparatus for use in an OFDM receiver for receiving packet data.

Note that in the embodiments described above, the terms used for the quantities often do not include that there may be different scaling factors.

It should be appreciated that although the invention has been described in the context of the OFDM variants of the IEEE 802.11 standard, the invention is not limited to such contexts and may be utilized in various other systems that use OFDM for receiving packet data. OFDM is one example of a multicarrier system in which the signal for transmission is split into a set of subcarriers. The invention may also be applicable to other wireless receivers that use multicarriers.

While an embodiment has been described for operation in an OFDM receiver with RF frequencies in the 2 GHz range (802.11g) and 5 GHz range (802.11a), the invention may be embodied in receivers and transceivers operating in other RF frequency ranges.

The IEEE 802.11a and 802.11g standards use OFDM and a preamble with two identical known long symbols that provide for channel estimation. The invention may be used with any data that includes known transmitted symbols or transmitted signals that may be accurately determined at the receiver. For example, the invention may include any number of known symbols at known locations. The symbols need not be identical. Furthermore, the symbols may be known because of the packet structure, or may become known via decision-direction and/or decoded-decision direction.

Note that in the embodiments described above, the output of the Fourier transformer is in rectangular coordinates and is coupled to a rectangular-to-polar converter (a Cordic) prior to the processing chain so that the smoothing, channel correction and pilot correction occurs in the amplitude and phase domain. In alternate embodiments, the output of the Fourier transformer is maintained in rectangular coordinates so that one or more of the smoothing, channel correction and pilot correction occurs in the rectangular (e.g., I-Q) domain.

Note that in some of the embodiments described above, the decision feedback is based on the previous symbol's decision, the invention maybe modified such that the decision two or even three symbols ago is used for the equalizing.

One embodiment of each of the methods described herein is in the form of a computer program that executes on a processing system, e.g., one or more processors that are part of an OFDM wireless receiver. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM, or in the form of carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate technique for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

In the claims below and the description herein, the term "comprising" or "comprised of" or "which comprises" is an "open" term that means including at least the elements/ features that follow, but not excluding others. The term "including" or "which includes" or "that includes" as used herein is also an "open" term that also means including at least the elements/features that follow the term, but not excluding others. Thus, including is synonymous with and means comprising.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. In a radio receiver for a wireless packet network, the radio receiver including an analog RF receiver and at least one analog-to-digital converter (ADC) to provide digital received signal samples of a received signal, the radio receiver designed for receiving OFDM signals including a multiplexed plurality of modulated subcarriers, the subcarriers modulated with symbols separated in time by an OFDM symbol period that includes a guard interval, an apparatus to accept the digital samples from the radio receiver and comprising:

a subtractor having a first input accepting the received signal samples from the radio receiver and a second input accepting to-be-subtracted equalizing signal, the subtractor having an output generating an equalized signal;

a discrete Fourier transformer having an output to provide the modulated subcarriers of the output of the subtractor;

a forward processing subsystem having an input coupled to the output of the discrete Fourier transformer to accept the subcarriers, and another input to accept signals that vary as an estimate of the channel response of the subcarriers, the forward processing subsystem including a channel corrector to correct the channel response of subcarriers based on the signals accepted by said another input and that vary as an estimate of the channel responses for the subcarriers, the forward processing subsystem further to carry out pilot correction on the subcarriers, the forward processing subsystem having an output to provide channel corrected modulated subcarrier;

a decision subsystem having an input coupled to the output of the forward processing subsystem, the input to accept the channel corrected subcarriers, the decision subsystem having an output to provide a symbol decision for each symbol of the channel corrected subcarriers;

a reverse processing subsystem having an input coupled to the output of the decision subsystem, the reverse processing subsystem to apply one or both of the phase error and the timing error that have been corrected in the forward processing subsystem, and the reverse processing subsystem having an output of a post-decision signal that includes an error that approximates one or both of the phase error and the timing error in the subcarriers accepted by the forward processing subsystem, the reverse processing system producing reverse processed post-decision subcarriers;

an inverse discrete Fourier transformer having an input coupled to the output of the reverse processing subsystem accepting the reverse processed post-decision subcarriers, the inverse discrete Fourier transformer having an output to provide time-domain post-decision signal samples; and a feedback filter having an input coupled to the output of the inverse discrete Fourier transformer accepting the time-domain post-decision signal samples, the feedback filter outputting a filtered, post-decision sampled signal filtered according to an impulse response approximating a post-guard interval channel impulse response, the filter having an output to provide the to-be-subtracted equalizing signal, the output of the feedback filter coupled to the second input of the subtractor, wherein the impulse response of the feedback filter is directly calculated, and such that the to-be-subtracted equalizing signal includes the effect of a past symbol decision and is used to equalize a present digital sampled symbol from the radio receiver.

2. An apparatus as recited in claim 1, wherein the most recent symbol decision is used to equalize a digitally sampled present symbol from the radio receiver.

3. An apparatus as recited in claim 1,
wherein some of the subcarriers are pilot subcarriers,
wherein the correcting for one or both of the timing error and the phase error uses the pilot subcarriers; and
wherein the reverse processing subsystem is coupled to the forward processing subsystem to accept from the forward processing subsystem a measure of one or both of the timing error and the phase error corrected in the forward processing subsystem.

4. An apparatus as recited in claim 1, wherein the discrete Fourier transformer, the forward processor, decision subsystem, and the inverse discrete Fourier transformer have a latency such that the first sample of time-domain post-decision signal is available at the input of the feedback filter at most a guard interval after the end of the last OFDM symbol.

5. An apparatus as recited in claim 1,
wherein the radio receiver is for receiving packets that each includes one or more known symbols,
wherein received signal samples corresponding to at least one of the known symbols are used to determine the signals that vary as an estimate of the channel response, and
wherein the signals that vary as an estimate of the channel response are used to determine the impulse response of the feedback filter.

6. An apparatus as recited in claim 1, wherein the decision subsystem is to make a hard decision.

7. An apparatus as recited in claim 5, wherein the wireless network conforms to at least one of the OFDM variants of the IEEE 802.11 standard.

8. An apparatus as recited in claim 5,
wherein the feedback filter is a FIR filter having an input to accept the impulse response for the feedback filter during a time that known symbols are received, and
wherein the impulse response of the feedback filter is determined from the signals that vary as the estimate of the channel response, the determining of the impulse response of the feedback filter including inverse discrete Fourier transforming the signals that vary as the estimate of the channel response.

9. An apparatus as recited in claim 5,
wherein the receiver is for receiving OFDM signals that each includes pilot subcarriers, and
wherein the discrete Fourier transformer determines pilot subcarriers in parallel with determining the other subcarriers of any received samples corresponding to an OFDM signal, such that the pilot subcarriers are available for pilot correction on all subcarriers.

10. An apparatus as recited in claim 9,
wherein the discrete Fourier transformer used to determine the non-pilot subcarriers determines at least some of the non-pilot subcarriers in parallel, and
wherein the forward processing subsystem, the decision subsystem, and the reverse processing subsystem each includes parallel data paths such that some of the subcarriers are forward processed and reverse processed in parallel.

11. A method comprising:
accepting a digitally sampled signal received in a radio receiver, the radio receiver for use in a wireless packet network, the radio receiver including an analog RF receiver and at least one analog-to-digital converter (ADC) to provide digital samples of a received signal, the radio receiver designed for receiving OFDM signals including a plurality of multiplexed modulated subcarriers, each modulated subcarrier including symbols separated in time by an OFDM symbol period that includes a guard interval, the method comprising:

subtracting an equalizing signal from the accepted received signal to produce an equalized signal;

discrete Fourier transforming the equalized signal to produce a set of modulated subcarriers corresponding to the received signal;

forward processing each modulated subcarrier, including channel correcting the modulated subcarriers according to signals that vary as an estimate of the channel response of each subcarrier, and further correcting the modulated subcarrier for one or both of phase error and timing error to produce channel corrected subcarriers;

forming a symbol decision of each channel corrected subcarriers;

reverse processing subcarrier signals that each correspond to the formed decision of the corresponding subcarrier, the reverse processing introducing an approximation of one or both of the phase error and the timing error corrected in the generating of the channel corrected samples;

inverse discrete Fourier transforming the reverse processed subcarrier signals to generate a digitally sampled time-domain post-decision signal; and filtering the time-domain post-decision signal using a feedback filter with an impulse response approximating a post-guard interval channel impulse response, the filtering generating the equalizing signal, wherein the impulse response is directly calculated, and such that the equalizing signal includes the effect of a past symbol decision for the equalizing signal's subcarriers and is used to equalize the present symbols of the subcarriers of the signal received at the radio receiver.

12. A method as recited in claim 11, wherein the most recent symbol decision for each subcarrier is used to equalize a present symbol of the subcarriers in the digital samples from the radio receiver.

13. A method as recited in claim 11,
wherein some of the subcarriers are pilots subcarriers,
wherein the correcting for one or both of the timing error and the phase error uses the pilot subcarriers, and
wherein the reverse processing uses a measure of one or both of the timing error and the phase error corrected for in the generating of the channel corrected samples.

14. A method as recited in claim 11, wherein the discrete Fourier transforming, the forward processing, the forming of the symbol decision, the reverse processing and the inverse discrete Fourier transforming take a time such that the first sample of time-domain post-decision signal is available for the filtering at most a guard interval after the end of the last OFDM symbol is received.

15. A method as recited in claim 11,
wherein the radio receiver is for receiving packets that each includes one or more known symbols,
wherein the samples of the received signal corresponding to at least one of the known symbols are used to determine the signals that vary as an estimate of the channel response, and
wherein the signals that vary as an estimate of the channel response are used to determine the impulse response of the feedback filter.

16. A method as recited in claim 11, wherein forming the symbol decision forms a hard decision.

17. A method as recited in claim 15, wherein the wireless network conforms to at least one of the OFDM variants of the IEEE 802.11 standard.

18. A method as recited in claim 15, further comprising:
determining the impulse response for the filtering from the signals that vary as the estimate of the channel response, the determining of the impulse response including inverse discrete Fourier transforming the signals that vary as the estimate of the channel response.

19. A method as recited in claim 15,
wherein each received OFDM signal includes pilot subcarriers, and
wherein the discrete Fourier transforming determines pilot subcarriers in parallel with determining the other subcarriers, such that the pilot subcarriers are available for pilot correction on all subcarriers.

20. A method as recited in claim 19,
wherein the discrete Fourier transforming for determining the non-pilot subcarriers determines at least some of the non-pilot subcarriers in parallel, and
wherein for some of the subcarriers, the forward processing, the forming of a symbol decision, and reverse processing operate in parallel to simultaneously process the plurality of subcarriers.

21. An apparatus comprising:
means for accepting a digitally sampled signal received in a radio receiver, the radio receiver for use in a wireless packet network, the radio receiver including an analog RF receiver and at least one analog-to-digital converter (ADC) to provide digital samples of a received signal, the radio receiver designed for receiving OFDM signals including a plurality of multiplexed modulated subcarriers, each modulated subcarrier including symbols separated in time by an OFDM symbol period that includes a guard interval, the method comprising;

means for subtracting an equalizing signal from the accepted received signal to produce an equalized signal;

means for discrete Fourier transforming the equalized signal to produce a set of modulated subcarriers corresponding to the received signal;

means for forward processing each modulated subcarrier, including means for channel correcting the modulated subcarriers according to signals that vary as an estimate of the channel response of each subcarrier, and means for correcting the channel corrected subcarrier for one or both of phase error and timing error to produce channel corrected subcarriers;

means for forming a symbol decision of each channel corrected subcarriers;

means for reverse processing subcarrier signals that each correspond to the formed decision of the corresponding subcarrier, the means for reverse processing including means for introducing an approximation of one or both of the phase error and the timing error corrected for in the generating of the channel corrected samples;

means for inverse discrete Fourier transforming the reverse processed subcarrier signals to generate a digitally sampled time-domain post-decision signal; and means for filtering the time-domain post-decision signal using a feedback filter with an impulse response approximating a post-guard interval channel impulse response, the filtering generating the equalizing signal, wherein the impulse response is directly calculated, and such that the equalizing signal includes the effect of a past symbol decision for each subcarrier and is used to equalize the present symbols of the subcarriers of the signal received at the radio receiver.

22. An apparatus as recited in claim 21, wherein the most recent symbol decision is used to equalize a present symbol of the digital samples from the radio receiver.

23. An apparatus as recited in claim 21,
wherein some of the subcarriers are pilots subcarriers,
wherein the means for correcting for one or both of the timing error and the phase error uses the pilot subcarriers, and
wherein the means for reverse processing uses a measure of one or both of the timing error and the phase error corrected for in the generating of the channel corrected samples.

24. An apparatus as recited in claim 21, wherein the means for discrete Fourier transforming, the means for forward processing, the means for forming the symbol decision, the means for reverse processing and the means for inverse discrete Fourier transforming together have a latency such that the first sample of time-domain post-decision signal is available for the means for filtering at most a guard interval after the end of the last OFDM symbol is received.

25. An apparatus as recited in claim 21,
wherein the radio receiver is for receiving packets that each includes one or more known symbols,
wherein the samples of the received signal corresponding to at least one of the known symbols are used to determine the signals that vary as an estimate of the channel response, and
wherein the signals that vary as an estimate of the channel response are used to determine the impulse response of the feedback filter.

26. An apparatus as recited in claim 21, wherein the means for forming the symbol decision includes a means for forming a hard decision.

27. An apparatus as recited in claim 25, wherein the wireless network conforms to at least one of the OFDM variants of the IEEE 802.11 standard.

28. An apparatus as recited in claim 25, further comprising:
means for determining the impulse response for the filtering from the signals that vary as the estimate of the channel response, the means for determining the impulse response using the means for inverse discrete Fourier transforming applied to the signals that vary as the estimate of the channel response.

29. An apparatus as recited in claim 25,
wherein each received OFDM signal includes pilot subcarriers, and
wherein the means for discrete Fourier transforming determines pilot subcarriers in parallel with determining the other subcarriers, such that the pilot subcarriers are available for pilot correction on all subcarriers.

30. An apparatus as recited in claim 29,
wherein the means for discrete Fourier transforming used to determine the non-pilot subcarriers determines at least some of the non-pilot subcarriers in parallel, and
wherein for some of the subcarriers, the means for forward processing, the means for forming a symbol decision, and the means for reverse processing operate to simultaneously process the plurality of subcarriers.

* * * * *